United States Patent [19]

Taninaka et al.

[11] 3,876,663

[45] Apr. 8, 1975

[54] PROCESS FOR THE MANUFACTURE OF CYCLIC MERCAPTALS

[75] Inventors: Kuniaki Taninaka, Ibaragi; Hitoshi Kurono, Amagasaki, both of Japan

[73] Assignee: Nihon Nohyako Kabushiki Kaisha, Cyno-ku, Tokyo, Japan

[22] Filed: Mar. 27, 1973

[21] Appl. No.: 345,319

[30] Foreign Application Priority Data
Apr. 4, 1972   Japan................................ 47-33702

[52] U.S. Cl............................... 260/327 M; 424/277
[51] Int. Cl.. C07d 69/00; C07d 71/00; C07d 73/00
[58] Field of Search ................................. 260/327 M

[56] References Cited
UNITED STATES PATENTS
2,493,071   1/1950   Kendall et al..................... 260/327
3,761,596   9/1973   Taninaka et al................... 424/277

OTHER PUBLICATIONS
Jensen et al., Acta Chem. Scand., 1968: 22(4) 1107–28.

*Primary Examiner*—Henry R. Jiles
*Assistant Examiner*—C. M. S. Jaisle
*Attorney, Agent, or Firm*—Brisebois & Kruger

[57] ABSTRACT

A manufacturing process of the compounds represented by the formula I

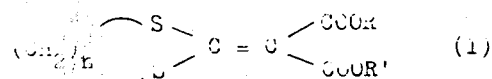

wherein R is a $C_1$–$C_4$ lower alkyl group or allyl group, R' is a $C_1$–$C_4$ lower alkyl group or allyl group and $n$ is an integral number 1, 2 or 3, said compounds are manufactured by adding carbon disulfide to malonic acid diester in an aqueous alkaline solution, followed by reacting with an dihalogenoalkane.

23 Claims, No Drawings

PROCESS FOR THE MANUFACTURE OF CYCLIC MERCAPTALS

DETAILED DESCRIPTION OF THE INVENTION

The present invention relates to a process for the manufacture of the cyclic mercaptals represented by the formula I,

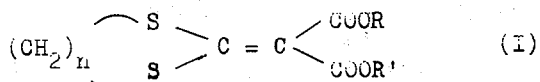

wherein, R is a $C_1$–$C_4$ lower alkyl group or allyl group, R' is a $C_1$–$C_4$ lower alkyl group or allyl group and $n$ is an integral number 1, 2 or 3.

The object of the present invention is to provide extremely useful and economical industrial scale manufacturing processes, of the compounds especially useful for agricultural and horticultural fungicides represented by the formula I.

The compounds represented by formula I are readily synthesized by adding carbon disulfide to the corresponding malonic acid diester in a suitable aqueous alkaline solution to produce the dialkali salt and then by reacting said dialkali salt with a dihalogenoalkane. The entire routes for synthesizing the compounds represented by the formula I according to the processes of the present invention are shown 1st step

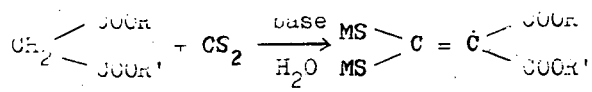

2nd step

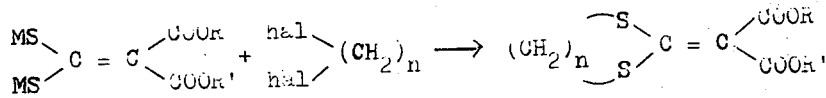

wherein, R and R' are as defined above, M is a alkali residue hal is a halogen atom.

That is, the processes according to the present invention comprise two reaction steps. The first step is to produce the dialkali salts by adding a corresponding carbon disulfide to a corresponding malonic acid diester in the aqueous alkaline solution and the second step is to produce the intended compound to react the dialkali salt, after isolating or not, with a dihalogenoalkane.

In the present invention, the reaction of the first step can proceed by reacting malonic acid diester with carbon disulfide under the existence of a base in the inactive solvent providing an aqueous solution of said base. In this case, sodium hydroxide and potassium hydroxide are economically useful as the base. Since metal sodium and sodium hydride, however, are dangerous, the use of these should be avoided. In the reaction of the first step according to the present invention, the existence of water is indispensable, but the use together with polar solvents such as acetone, alcohol, tetrahydrofurane, dioxane, dimethyl sulfoxide, dimethyl acetoamide, dimethyl formamide, diethyl formamide, etc. is acceptable. The reaction of the second step generally proceeds in the same solvent system successively from the first step, but it is also possible to make the reaction in the inactive solvent after isolating the dialkali salt, and either mode is covered in the scope of the present invention. That is, generally, the reaction progresses by adding the dialkali salt in an aqueous solution produced through the first process to a dihalogeno alkane, and vice versa. For accelerating the reaction, it is effective to apply heat. On the other hand, in the second process step, the excessive use of the reactant of dihalogeno alkane is effective for improving the function as solvent. There are available as dihalogenoalkanes such as dichroalkane, dibromalkane and diiodoalkane for this process.

Since the above solvents being jointly useable with water have an affinity with water, the reuse of hydrate solvent is possible by collecting and regenerating.

The amount of water used in the first reaction step depends upon the types of bases to be used, but usually, in the event of the above mentioned bases, the provision of an aqueous solution in 20–60 percent by weight is advantageous. Therefore, a 20–40 percent NaOH aqueous solution and 30–60 percent KOH are preferable. The use of alkali in a molar excess amount or in an amount comparatively greater than the stoichiometry is recommendable.

Since the reaction in the first step is exothermic, the reaction temperature within the low temperature range is advantageous. In the second step, the temperature is selectable within the range of 50°–90°C. At the beginning of the reaction of the second step, water can be newly added, if necessary. It is recommendable to employ the dialkali salt in the alkaline condition of the solvent concerned with the second reaction.

In the present invention, the reaction mol ratios; 2 to 4 mol of alkali, 1 to 1.5 mol of carbon disulfide and 1 to 8 mol of dihalogenoalkane are conveniently used per 1 mol of malonic acid diester. However, by the above example of reaction mol ratios the present invention is not restricted.

By applying the first step according to the present invention, the desired dialkali salt is obtainable in approximately quantitative yield. After the completion of the second step reaction, the desired compound can be obtained from the reaction products in the usual manner. The processes according to the present invention, provide the following advantages:

1. Since the reaction can proceed by using ordinary bases such as sodium hydroxide and potassium hydroxide, the manufacturing process can be safely and economically progressed.
2. The usability of water as solvent allows economical production and an extremely high yield rate.
3. In addition, the application of excessive dihalogeno alkane more than the stoichiometry makes it possible to improve the yield.
4. The yield can be increased by using the alkali in more than stoichiometry amounts.

5. After completion of the first process step, the second process step can be succeeded uninterruptedly without intentionally isolating and refining the dialkaline salts, allowing an extremely easy quantity production.

6. The water is useful for controlling the reaction temperature such as for readily maintaining the optimum reaction temperature, and also helpful for removing by-product salts (NaCl or KCl) outside the reaction system and accelerating the reaction velocity.

7. The use of excess dihalogeno alkaline contributes to simplify the isolating operation of the desired compounds. In all, the excessive dihalogeno alkane takes up the desired compounds in it and then the desired compounds can be easily obtained by the conventional isolating operation from the dihalogeno alkane layers after completing the reaction. Also, the reaction velocity can be accelerated by taking up the desired compounds.

As described above, low cost production can be achieved without providing special operation, facilities or control. The compounds represented by the formula I are particularly useful as agricultural and horticultural fungicides. The representative compounds represented by the formula I are followed as:

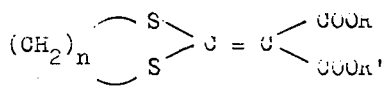

| No. | R | R' | n | m.p.°C | b.p.°C/mmHg |
|---|---|---|---|---|---|
| | 1.3-Dithiethanes | | | | |
| 1 | $CH_3$ | $CH_3$ | 1 | 71–74 | — |
| 2 | $C_2H_5$ | $C_2H_5$ | 1 | 97–99 | — |
| 3 | i-$C_3H_7$ | i-$C_3H_7$ | 1 | 104–105 | — |
| 4 | n-$C_4H_9$ | n-$C_4H_9$ | 1 | 101–102 | — |
| 5 | i-$C_4H_9$ | i-$C_4H_9$ | 1 | 45–46.5 | — |
| 6 | t-$C_4H_9$ | t-$C_4H_9$ | 1 | 127–129 | — |
| 7 | $CH=CH-CH_2$ | $CH=CH-CH_2$ | 1 | 74–79 | — |
| 8 | $CH_3$ | t-$C_4H_9$ | 1 | 69–73 | — |
| 9 | $C_2H_5$ | n-$C_4H_9$ | 1 | 51–54 | — |
| 10 | $C_2H_5$ | i-$C_3H_7$ | 1 | 37–39 | — |
| | 1.3-Dithiolanes | | | | |
| 11 | $CH_3$ | $CH_3$ | 2 | 64–66 | — |
| 12 | $C_2H_5$ | $C_2H_5$ | 2 | 48–49 | — |
| 13 | n-$C_3H_7$ | n-$C_3H_7$ | 2 | — | 168–169/0.3 |
| 14 | i-$C_3H_7$ | i-$C_3H_7$ | 2 | 50–51 | 167–169/0.5 |
| 15 | n-$C_4H_9$ | n-$C_4H_9$ | 2 | — | 177–183/0.25 |
| 16 | i-$C_4H_9$ | i-$C_4H_9$ | 2 | — | 171–173/0.01 |
| 17 | s-$C_4H_9$ | s-$C_4H_9$ | 2 | — | 179–181/0.01 |
| 18 | t-$C_4H_9$ | t-$C_4H_9$ | 2 | 88–90 | — |
| 19 | $CH=CH-CH_2$ | $CH=CH-CH_2$ | 2 | — | 171–174/0.2 |
| 20 | $CH_3$ | t-$C_4H_9$ | 2 | 68–71 | — |
| 21 | $CH_3$ | $CH=CH-CH_2$ | 2 | — | 124–127/5 |
| 22 | $C_2H_5$ | i-$C_3H_7$ | 2 | 37–39 | — |
| 23 | $C_2H_5$ | n-$C_4H_9$ | 2 | — | 127–129/2 |
| 24 | $C_2H_5$ | i-$C_4H_9$ | 2 | — | 160–164/2 |
| 25 | $C_2H_5$ | s-$C_4H_9$ | 2 | — | 175–179/0.1 |
| 26 | $C_2H_5$ | t-$C_4H_9$ | 2 | 52–54 | — |
| | 1.3-Dithianes | | | | |
| 27 | $CH_3$ | $CH_3$ | 3 | 39–41 | — |
| 28 | $C_2H_5$ | $C_2H_5$ | 3 | 49–51 | — |
| 29 | i-$C_3H_7$ | i-$C_3H_7$ | 3 | 95–96 | — |
| 30 | n-$C_4H_9$ | n-$C_4H_9$ | 3 | 102–105 | — |
| 31 | $CH=CH-CH_2$ | $CH=CH-CH_2$ | 3 | 35–36 | — |
| 32 | $CH_3$ | t-$C_4H_9$ | 3 | 77–81 | — |
| 33 | $C_2H_5$ | i-$C_3H_7$ | 3 | 57–59 | — |
| 34 | $C_2H_5$ | n-$C_4H_9$ | 3 | 68–71 | — |

In the event of application of the compounds of the formula I as agricultural and horticultural fungicides, the said compounds may be conveniently formulated to the form of fungicidal composition by diluting with inert diluents and/or carriers through known procedures. Stated illustratively, the compounds of the formula I may be processed into suitable forms, for example, solution, emulsifiable concentrate, wettable powder, dust, granule, paste and seed coating agent by dissolving, dispersing, mixing, impregnating or absorbing into inert carriers, optionally with addition of adjuvants. In this case, the certainty or increase of the effect may be intended with addition of adhesives, wetting agents coloring matters etc. Suitable inert carriers employed in the present invention may be solid or liquid. As solid carrier the following substances are mentioned: soybean flour, corn meal, nutshell meal, ground tobacco plant stalk, saw dust, wood powder, bark dust, bran, cellulose powder; ground vegetable products such as residues of plant extractions; paper, corrugated cardboard, fiber products such as aged cloth; ground synthetic resin; clay (for example, kaoline, bentonite, terra abla) talc (for example, talc, pyroferrite) silica (for example, diatomaceous earth, feldspar, mica, synthetic highly dispersed siliates, synthetic silicates), ground minerals such as ground sulfur, activated charcoal, pumice stone, sand and so on; chemical fertilizer such as ammonium sulphate, ammonium phosphate, ammonium nitrate, urea, ammonium chloride as well as Glauber's salt and soluble substances such as saccharides.

The substances which can be used as liquid carriers may be selected from substances with solvation ability per se and substances without solvation ability which can disperse active ingredient compounds by the aid of adjuvants. For example, the following materials are mentioned; water, alcohols (for example, methyl alcohol, ethyl alcohol, ethylene glycol), ketones (for example, acetone, methyl ethyl ketone), ethers (for example, ethyl ether, dioxane, tetrahydrofurane, cellosolve), aliphatic hydrocarbons (for example, gasline, kerosene), aromatic hydrocarbons (for example, benzene, toluene, xylene, solvent naphtha, methyl naphthalene), halogenated hydrocarbons (for example, dichloroethane, benzene chloride, carbon tetrachloride), acid amide (for example, dimethylformamide, demethylacetamide), esters (for example, acetic ethyl), nitriles (for example, acetonitrile), dimethylsulfoxide and so on. These substances can either be used alone or in admixture with one another.

As an example of the surface active agents which can be used in the present invention, the following materials are mentioned, but the present invention is not limited to these substances, polyoxyethylene, alkyl aryl ether, sorbitan, monolaurate, alkylaryl sorbitan monolaurate, alkyl benzene sulfonate, alkylnaphthalene sulfonate, lignin sulfonates, higher alcohol sulphur ester salt. These substances can either be used alone or in combination with one another.

As stickers, binders and dispersants used in the present invention, the following substances are mentioned, but the present invention is not limited to these substances: casein, gelatine, starch, alginic acid, CMO, gum arabia, agar, polyvinyl alcohol, palm root oil, rice bran oil, bentonite, lignin, sulfite waste.

The incorporated portion of active ingredients may be reduced or increased as desired. In the case of use as dusts or granules, it is commonly 0.5–20 percent (by weight) and in the case of use as emulsions or wettable powders, it is advantageously 10–15 percent (by weight).

The compositions according to the present invention are intended to be used to prevent and or cure agricultural and horticultural plant diseases by applying them with a fungicidally effective amount of the active ingredients as they are, diluted with or suspended in water as necessary according to the situations of plants or surroundings, and are remarkably effective against leaf blast and sheath blight of rice plants. The present invention, therefore, includes in its scope, preventive and curing application modes such as direct application to the plants above the soil, or application through paddy field water or soil. The application amount of the compositions according to the present invention are dependent upon various factors such as sorts of diseases, degree of damage, tendencies of disease occurrence, climatic conditions, surrounding conditions, types of formulations. For example, when using them eventually in liquid states such as emulsion, or wettable powder, it is practicable that the ultimate concentration of the effective components is made at least 0.001 percent by weight. Also, dusts (generally, the content as effective components ranges from several percent to 10 percent by weight) are used at the rate of 1–10kg per 10 acres, and granular agents (generally, the content as effective component ranges from several percent to 10–19 percent by weight) are used at the rate of 1–10kg per 10 acres. However, the present invention is not restricted in its scope by the above ranges.

The compositions according to the present invention are applicable together or mixed with one of other agricultural chemicals, fertilizers, plant nourishing agents. For example, in the case of preventing rice plants from leaf blast and sheath blight by using the compositions according to the present invention, they can be used together with insecticides (fungicide by case) which control harmful insects to rice plant.

For providing the effectiveness of the compound (I) as agricultural fungicide, the test examples are presented. The numbers assigned to the compounds correspond to those previously indicated. The high effectiveness of compound (I) as an agricultural fungicide agent, in particular, blast preventive agent, is obvious from the following test examples.

TEST EXAMPLES

Sixteen grains of rice seeds were seeded in a procelain pot of 12 cm diameter, cultivated under the rice plant field conditions in a greenhouse, and when the seedlings had grown to the third-leaf stage, water was controlled in 2 cm-depth, the agent was applied at the rate of 300g per 10 ares as an active ingredients. After application of the agent, inoculation was made at certain periods of time by spraying the blast germ suspension cultivated in the rice plant straw. On 4 days after inoculation, disease spot was investigated and preventive value was calculated by counting the number of disease spots per leaf. The active components represented by the formula

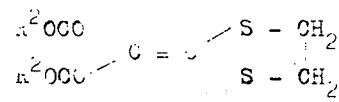

wherein $R_2$ is an ethyl, i-propyl, n-propyl or allyl group, were employed.

| Active Ingredient | Preventive value | | | | | | |
|---|---|---|---|---|---|---|---|
| | Days from application to inoculation | | | | | | |
| | 0 | 1 | 7 | 14 | 21 | 28 | 42 |
| i-$C_3H_7$- | 0 | 27 | 94 | 92 | 89 | 78 | 67 |
| n-$C_3H_7$- | 0 | 21 | 90 | 87 | 74 | 51 | 5 |
| $C_2H_5$- | 0 | 36 | 89 | 85 | 71 | 45 | 0 |
| $CH_2=CH-CH_2$ | 0 | 25 | 70 | 52 | 28 | 11 | 0 |

EXAMPLE 1

Diisopropylcarbonyl ketene dipotassium mercaptide 12g of potassium hydroxide was dissolved in 30ml of water and 18.8g of malonic acid diisopropyl and 7.6g of carbon disulfide was added dropwise thereto with stirring, while maintaining at 15°–20°C. For a further 30 minutes after addition completion, the solution was stirred and 250ml of ether was added thereto. The resultant, yellow crystal was collected by filtering. The thus obtained yellow crystal was washed with dioxane-ether (1:1) and dried under vacuum to give a quantitative yield of diisopropoxycarbonyl ketene dipotassium pentahydrate.

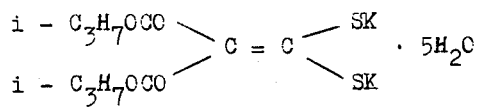

EXAMPLE 2

Diisopropoxycarbonyl ketene disodium mercaptide and diisopropyl 1,3-dithiolan-2-yeidene malonate.

38g of malonic acid diisopropyl and 15g of carbon disulfide was simultaneously added, with stirring, to a mixed solvent of 20ml of water and 100ml of acetone, containing 16g of caustic soda, while being maintained at 10°–20°C. The reaction solution became red in color and the reaction was an exothermic reaction and after 10 minutes, the color of said solution returned to pale yellow. 200ml of acetone was added to this solution and cooled. The reaction product gelled and was filtered thereby quantitatively obtaining diisoproxycarbonyl ketene disodium mercaptide pentahydrate.

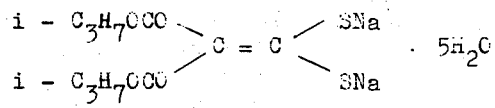

Elementary analysis for $C_{10}H_{24}O_9S_2Na_2$.
  Calculated: C% : 33.42,   H% : 7.17,   S% : 19.18.
  Found : C% : 33.21,   H% : 7.13,   S% : 19.05.

Then, 8g of disodium salt of the product was dissolved in 50ml of dimethylsulfoxide and reacted with 2g of 1,2-dichloroethane for 2 hours at room temperature, with stirring. After reaction completion, the reaction content was poured into 200ml of ice water to give a precipitate of the object compound in a yellow crystal, followed by filtration and recrystallization from isopropylalcohol to obtain 4.5g of crystal having a melting point; 51°–51.5°C in 78 percent yield.

EXAMPLE 3

Diisopropyl 1.3-dithiolan-2-ylidene malonate
(compound No. 14)

20ml of an aqueous solution obtained by dissolving 8g of caustic soda was slowly added, with stirring, to 18.8g (0.1mol) of malonic acid diisopropyl and 7.6g of carbon disulfide, while being maintained at 10°–15°C. After this addition, stirring was continued for 30 minutes at the same temperature and then, 20ml of water was added thereto and lastly, 10g (0.1 mol) of 1,2-dichlorolthane was added dropwise thereto. After addition completion, the solution was heated to 60°C for 1 hour. Thereafter, the reaction content was extracted with 100 ml of ether and washed with water. After drying, ether was distilled off thereby obtaining 10g of the end product as a yellow crystal. The yield was 35 percent.

EXAMPLE 4.

Diisopropyl 1,3-dithiolan-2-ylidene malonate
(compound No. 14)

18.8g of malonic acid diisopropyl and carbon disulfide was added, with stirring at 10°–20°C to 8g of caustic soda dissolved in 12 ml of water and 100 ml of acetone. After addition completion, the solution was stirred for 2 hours at room temperature and then, 18.8 g (0.1 mol) of 1,2-dibromoethane was added dropwise thereto and refluxed for 2 hours at 60°–70°C. After reaction completion, most of the acetone was distilled off and the reaction mixture was cooled by adding about 100 ml of water to crystallize the end product as a white crystal. Said crystal was filtered off and washed with water and n-hexane, thereby to give 21g of the crystal. The crystal exhibited 50.5°C of a melting point, on recrystallizing from n-hexane. The yield was 75 percent.

EXAMPLE 5

Diisopropyl 1,3-dithiolan-2-ylidene malonate
(Compound No. 14)

38g of malonic acid diisorpropyl and 15g of carbon disulfide were charged into 250 ml of isopropyl alcohol. 50 ml of water dissolved with 17g of caustic soda was slowly added dropwise to the resultant solution at 10°–20°C under stirring. After addition completion, the solution was stirred for 2 hours at room temperature and then, 38g of 1.2-dibromethane was added dropwise thereto and heated for 3 hours at 60°–70°C under reflux. After reaction completion, the most part of isoproypl alcohol was distilled off and poured into a large quantity of water to precipitate the end product as a pale yellow crystal. After filtering, the product was washed with n-hexane thereby obtaining 40g of the crystal. The melting point was 50°–51°C and the yield was 70 percent.

EXAMPLE 6

Diisopropyl 1,3-dithiolan-2-ylidene malonate
(Compound No. 14)

30 percent aqueous solution of potassium hydroxide was added into 80 ml of dimethyl formamide so that the quantity of caustic potassium reached 11.2g and then, 19g of malonic acid diisopropyl and 7.6g of carbon disulfide were added thereto. The color of reaction solution changed to a red within 10 minutes after addition completion. 10g (0.1 mole) of 1,2-dichloroethane was added dropwise to the solution and was sujected to reaction by heating and stirring for 4 hours at 70°–80°C. Then, the reaction solution was allowed to cool to room temperature. This solution was poured into 500 ml of ice water thereby crystallizing the end compound I as a white crystal. After filtering, the product was recrystallized from benzene thereby oftaining 16.5g of a white crystal with a melting point: 50.5°–51°C. The yield was 57 percent.

EXAMPLE 7

Diisopropyl 1,3-dithiolan-2-ylidene malonate
(Compound No. 14)

A 30 percent aqueous solution of caustic potassium was added to 200 ml of dioxane so that the quantity of caustic potassium reached 22.5g and then, 38g of malonic acid diisopropyl and 15g of carbon disulfide were added thereto at a temperature maintained at 10°–20°C and then, stirring was carried out for 2 hours at room temperature. Lastly, 38g of 1,2-dibromoethane was added to the solution and the resultant solution was heated, with stirring, for 2 hours at 50°–80°C. After reaction completion, the most of the used solvent was distilled off and the reaction product was poured into a large quantity of water thereby to precipitate the end product as a white crystal. Said crystal was filtered off and washed with water and n-hexame thereby to obtain 41g of crystal with a melting point, 51.5°–52°C. The yield was 70 percent.

EXAMPLE 8

Diisopropyl 1,3-dithiolan-2-ylidene malonate
(Compound No. 14)

8.0g (0.2 mol) of caustic soda dissolved in 20 ml of water was added dropwise to a mixture of 20g (0.1 mol) of malonic acid diisopropyl and 7.6g (0.1 mol) of carbon disulfide, while being cooled with ice water at less than 20°C. The solution was stirred for a further 30 minutes at the same temperature thereby producing a quantitative yield of diisopropoxycarbonyl ketene disodium mercaptide as a white crystal.

Then, 100 ml of water was added to said solution (after this addition, 20.4 percent of disodium salt's concentration was calculated as an anhydride). Thereafter, 10g (0.1 mol) of 1,2-dichloroethane was added to the solution at one time and the solution was subjected to reaction by heating for 2 hours at 60°–80°C. After reaction completion, the reaction product was extracted with ether and washed and dried. Ether was distilled off thereby producing 19.3g (the purity: 79.4 percent) of a crude crystal. The pure yield was 52.8 percent.

EXAMPLE 9

Diisopropyl 1,3-dithiolan-2-ylidene malonate
(Compound No. 14)

The same process as the second process in Example 8 was applied except for the use of 30g (0.3 mol) of 1,2-dichloroethane in place of 10g and the use of benzene as the extracting agent, thereby 21.5g (purity: 91.0 percent) of a white crude crystal being obtained. The pure yield was 64.7 percent.

EXAMPLE 10

Diisopropyl 1,3-dithiolan-2-ylidene malonate
(Compound No. 14)

Diisopropoxycarbonyl ketene disodium mercaptide was synthesized in the same manner as the first process described in Example 8. After reaction completion, the reaction solution added with 100 ml of water (after this addition, 20.4 percent of the disodium salt's concentration was calculated as an anhydride) was added dropwise, with stirring, to 50g of 1,2-dichloroethane while heating to 50°–60°C. Consequently, stirring was carried out for 4 hours at the same temperature. After reaction completion, the reaction solution was extracted with a large quantity of ether, washed with water and dried. Thereafter, excess 1,2-dichloroethane and ether was distilled off, thereby the end product was obtained as a pale yellow crystal. The yield was 25.8g (purity: 83.4 percent) and the pure yield was 74.2 percent.

EXAMPLE 11

Diisopropyl 1,3-dithiolan-2-ylidene malonate
(Compound No. 14)

37.4g (0.4 mol) of a 60 percent aqueous solution of KOH was gradually added dropwise to a mixture of 18.8g (0.1 mol) of diisopropyl malonate and 7.6g (0.1 mol) of $CS_2$, while being maintained at less than 20°C and then, by stirring for 30 minutes at the same temperature, the yellow aqueous solution of the medium, diisopropoxycarbonyl ketene dipotassium mercaptide was prepared. Further, 100 ml of water was added to this solution and the solution was reacted with 50g (0.5 mol) of 1,2-dichloroethane by stirring for 1 hour at 60°C. After reaction completion, the dichloroethane layer was separated off and washed with water and concentrated under reduced pressure, thereby 22g of the end product was obtained as a yellow crystal. The yield was 76.4 percent. On recrystallizing from i-$C_3H_7OH$, the melting point of said product was 54°–55°C.

EXAMPLE 12

Diisopropyl 1,3-dithiolan-2-ylidene malonate
(Compound No. 14)

50g (0.5 mol) of 1,2-dichloroethane was added to an aqueous solution of the disodium salt prepared according to the same operations as in Example 8 and was subjected to reaction by heating for 1 hour at 60°C. After reaction completion, the 1,2-dichloroethane layer was separated and concentrated thereby obtaining 24.3g of a crude yellow crystal. The yield was 84.6 percent.

Example 13

Dimethyl-1,3-dithiolan-2-ylidene malonate
(Compound No. 11)

When 26.7g of 30 percent NaOH aqueous solution was gradually added to a mixture of 13.2g (0.1 mol) of dimethyl malonate and 7.6g of $CS_2$, while being maintained at less than 20°C in ice water, the content became exothermic to form a yellow precipitate. Consequently, stirring was carried out for 30 minutes at the same temperature to form a red transparent solution of dimethoxy carbonyl ketene disodium mercaptide.

Further, 50 ml of water was added to said solution without isolating said disodium salt and 50g (0.5 mol) of 1,2-dichloroethane was added thereto at one time and was subjected to reaction by stirring for 4 hours at 50°–80°C. After reaction completion, the reaction content was extracted with 300 ml of ether and washed with water and dried. Thereafter, the solvent was distilled off thereby obtaining 17g (the yield: 72.5 percent) of the end product as a yellow crystal. Upon recrystallizing from methanol, the melting point was 64°–66°C.

EXAMPLE 14

Diethyl-1,3-dithiolan-2-ylidene malonate (Compound No. 12)

40.2g (0.3 mol) of 40 percent KOH was added to 16g (0.1 mol) of diethyl malonate and 7.6g (0.1 mol) of $CS_2$, while being maintained at less than 20°C. While continuously stirring for 30 minutes at the same temperature, a yellow solution of the medium, dipotassium salt, was formed. Further 50 ml of water was added to an aqueous solution of this medium and 56.5g (0.3 mol) of 1,2-dibromoethane was gradually added dropwise thereto with heating to 60°–70°C. The solution was subjected to reaction by stirring for 2 hours at the same temperature. After reaction completion, excess 1,2-dibromoethane was distilled off and then, the reaction content was cooled, thereby the end product being precipitated as a pale yellow crystal. The obtained amount was 21.5g (yield was 83 percent). Upon recrystallizing from n-hexane, the melting point was 48°–47°C.

EXAMPLE 15

Di-n-propyl-1,3-dithiolan-2-ylidene-malonate
(Compound No. 13)

A 30 percent NaOH aqueous solution was gradually added dropwise to a mixture of 18.8g (0.1 mol) of di-n-propyl malonate and 7.6g (0.1 mol) of $CS_2$, while being maintained at less than 20°C. While continuously stirring for 30 minutes at the same temperature, a disodium salt of di-n-propoxy carbonyl ketene mercaptide was prepared. 50 ml of water was added to the aqueous solution of the disodium salt and then, 50g (0.5 mol) of 1.2-dichloroethane was added thereto. The solution was subjected to reaction by heating at 50°–80°C for 4 hours. After completion of the reaction, the reaction content was extracted with 300 ml of chloroform and washed with water and dried and distilled under reduced pressure, thereby 21.8g of a pale yellow oily product was obtained (the yield: 75.5 percent), its boiling point being 168°–169°C/0.3mmHg.

EXAMPLE 16

Di-t-butyl-1, 3-dithiolan-2-ylidene malonate 38.2g(0.2 mol) of 30 percent KOH aqueous solution was slowly added to a mixture of 21.2g(0.1 mol) of di-t-butyl malonate and 7.6g(0.1 mol) of $CS_2$ at less than 20°C and further, stirring was continued for 30 minutes at the same temperature to obtain a yellow-red aqueous solution of the medium product.

50 ml of water was added to said solution and then, was gradually added dropwise to 56.5g(0.3 mol) of 1,2-dibromoethane previously heated to 40°–60°C and the solution was allowed to react by stirring for 2 hours at the same temperature. After completion of the reaction, the reaction content was extracted with 500 ml of ether and washed with water and dried. Thereafter, the solvent was distilled off to obtain 28g of a white crystal (the yield was 88 percent). On recrystallizing from n-hexane, the melting point was 88°–89°C.

EXAMPLE 17

Di-allyl-1, 3-dithiolan-2-ylidene malonate (compound No. 19)

26.7g(0.2 mol) of a 30 percent NaOH aqueous solution was added dropwise to a mixture of 18.4g(0.1 mol) of diallyl malonate and 7.6g(0.1 mol) of $CS_2$ at less than 20°C to obtain a yellow aqueous solution of disodium salt of diallyloxy carbonyl ketene mercapatide. 50 ml of water was added to an aqueous solution of this medium and 50g(0.5 mol) of 1, 2-dichloroethane was added thereto at one time and the resultant solution was allowed to react by stirring for 4 hours at 50°–80°C. After reaction completion, excess 1, 2-dichloroethane was distilled off and the reaction content was extracted with 300 ml of benzene, washed with water and dried and distilled under reduced pressure, thereby 19.5g of a pale yellow oily product was obtained (the yield was 68 percent), its boiling point being 171°–174°C/0.2mmHg.

EXAMPLE 18

0-ethyl, 0-i-propyl1, 3-dithiolan-2-ylidene malonate

40g(0.3 mol) of a 30 percent NaOH aqueous solution was slowly added to a mixture of 17.4g(0.1 mole) of ethyl, i-propyl malonate and 7.6g(0.1 mol) of $CS_2$ at less than 20°C and stirring was continued for 3 hours to prepare di-Na salt of the medium. 50g(0.5 mol) of 1, 2-dichloroethane was added to the solution without isolating said salt and the resultant solution was allowed to react by stirring for 4 hours at 50°–80°C. After reaction completion, excess 1, 2-dichloroethane was distilled off and then, the reaction content was extracted with 300 ml of ether, washed with water and dried and lastly, distilled under reduced pressure, thereby the end product crystallized as a pale yellow crystal, the obtained amount was 15.6g(the yield was 56.5 percent).

On recrystallizing from n-hexane, the melting point was 37°–39°C.

EXAMPLE 19

0-ethyl-0-sec-butyl-1,3-dithiolan-2-ylidene malonate (compound No. 25)

38.3g(0.2 mol) of a 30 percent KOH aqueous solution was gradually added dropwise at less than 20°C to a mixture of ethyl, sec-butyl malonate and 8.8g(0.1 mol) of $CS_2$ and the resultant solution was allowed to react by stirring for 30 minutes at the same temperature.

50 ml of water was added to the reaction solution without isolating the obtained dipotassium salt and 29.7g (0.3 mol) of 1,2-dichloroethane was added thereto and the solution was subjected to reaction by stirring for 4 hours at 50°–80°C. After reaction completion, the reaction content was extracted with chloroform, washed with water, dried and distilled to give the end product having a boiling point of 175°–179°C/0.1 mmHg. The obtained amount was 21g(yield was 73 percent).

EXAMPLE 20

0-methyl-0-t-butyl-1,3-dithiolan-2-ylidene malonate (compound No. 20)

26.7g(0.2 mol) of a 30 percent NaOH aqueous solution was slowly added at less than 20°C to a mixture of 17.4g (0.1 mol) of methyl, tert butyl malonate and 7.6g(0.1 mol) of $CS_2$. 18.8g(0.1 mol) of 1,2-dibromo ethane was added dropwise to the aqueous solution of the formed disodium salt and reaction solution was stirred and heated for 2 hours at 50°–80°C. After reaction completion, the reaction content was extracted with 300 ml of ether, washed with water, dried and distilled off the solvent under reduced pressure to obtain 18.5g of a pale yellow crystal (yield was 67 percent). Upon recrystallizing from n-hexane-benzene, the melting point was 68°–71°C.

EXAMPLE 21

Dimethyl-1,3-dithiethan-2-ylidene malonate (compound No. 1) With the same operations employed in Example 13, 20ml of an aqueous solution containing 8.8g(0.2 mol) of NaOH was added dropwise to a mixture of 13.2g(0.1 mol) of dimethyl malonate and 7.6g(0.1 mol) of $CS_2$ to prepare an aqueous solution of disodium salt 50 ml of water was added to said solution without isolating the disodium salt and 34.5g(0.2 mol) of 1,1-dibromomethane was added thereto at one time. Then, the resultant was subjected to reaction by heating for 2 hours at 60°–70°C. After reaction completion, the reaction content was extracted with 250 ml of benzene, washed with water and dried. The solvent was distilled off under reduced pressure thereby obtaining 17.8g of a white crystal (yield was 81 percent). Upon recrystallizing from n-hexane-$C_6H_6$, the melting point was 71°–74°C.

EXAMPLE 22

Diethyl-1,3-dithiethan-2-ylidene malonate (compound No. 2).

The aqueous solution of dipotassium salt was prepared from 16g(0.1 mol) of diethyl malonate. 7.6g(0.1 mol) of $CS_2$ and 30 ml of water containing 23g(0.4 mol) of KOH with the same operations employed in Example 14 and 50 ml of water was added to said solution and lastly, 52g(0.3 mol) of 1, 1-dibromomethane was added dropwise thereto. Then, the resultant solution was allowed to react by heating for 2 hours at 50°–70°C. After reaction completion, the reaction content was extracted with 200 ml of ether and dried. Thereafter, the solvent was distilled off to obtain 20.5g of a pale yellow crystal (yield was 82 percent). Upon recrystallizing from ethanol, the melting point was 97°–99°C.

EXAMPLE 23

Diisopropyl-1,3-dithiethan-2-ylidene malonate (compound No. 3)

18.8g(0.1 mol) of diisopropyl malonate, 7.6g(0.1 mol) of $CS_2$ and 20 ml of water containing 8.8g(0.22 mol) of NaOH were used to prepare the aqueous solution of the disodium salt in accordance with the same operations employed in Example 15 and 50 ml of water was added to the obtained solution and lastly, 52g(0.3 mol) of 1, 1-dibromomethane was added thereto. The obtained solution was allowed to react by heating for 2 hours at 50°–70°C. After reaction completion, the reaction content was extracted with 300 ml of ether, washed with water, dried and distilled under reduced pressure to give the reaction product as a pale yellow crystal. The obtained amount was 23g (yield was 86.5 percent). Upon recrystallizing from isopropanol, the melting point was 104°–105°C.

EXAMPLE 24

0-ethyl-0-isopropyl-1,3-dithiethan-2-ylidene malonate (compound No. 10)

17.4g(0.1 mol) of ethyl, isopropyl malonate, 7.6g(0.1 mol) of $CS_2$ and 26.7g of a 30 percent NaOH aqueous solution were used, to prepare the aqueous solution of the disodium salt in accordance with the same operations employed in Example 18. 50 ml of water was added to said solution and then, 34.6g (0.2 mol) of 1, 1-dibromomethane was added dropwise thereto. The resultant solution was subjected to reaction by heating for 2 hours at 50°–70°C. After reaction completion, the reaction product was extracted with 300 ml of $CCl_4$ (carbon tetrachloride), washed with water and distilled under reduced pressure to obtain 20g of a yellow-white crystal as the end product (yield: 76.5 percent). Upon recrystallizing from n-hexane-$C_6H_6$, the melting point was 37°–39°C.

EXAMPLE 25

Diethyl-1,3-dithian-2-ylidene malonate (compound No. 28)

50 ml of water was added to an aqueous solution of disodium salt which was obtained by reacting 16.0g(0.1 mol) of diethyl malonate, 7.6g(0.1 mol) of $CS_2$ and 26.7g(0.2 mol) of a 30 percent NaOH aqueous solution in the same operations as in Example 14 and lastly, 20g(0.1 mol) of 1,3-dibromopropane was added dropwise to said solution. The resultant solution was allowed to react by stirring for 2 hours at 60°–80°C. After reaction completion, the reaction content was extracted with 300 ml of benzene, washed with water and dried. Thereafter, the solvent was distilled off under reduced pressure and as a result, 22.5g of the end product was formed as a yellow crystal (yield:81.5 percent). Upon recrystallizing from methanol, the melting point was 49°–51°C.

EXAMPLE 26

Di-i-propyl-1,3-dithian-2-ylidene malonate (compound No. 29)

An aqueous solution of the medium, disodium salt, of diisopropoxy carbonyl ketene mercaptide was prepared from 18.5g (0.1 mol) of di-isopropyl malonate, 7.6g(0.1 mol) of $CS_2$ and 38.3g(0.2 mol) of a 30 percent KOH aqueous solution in the same operations as in Example 15 and further, 50 ml of water and lastly, 56.5g(0.5 mol) of 1,3-dichloropropane were added to said solution. Then, the resultant solution was subjected to reaction by heating for 4 hours at 50°–80°C. After reaction completion, an excess 1,3-dichloropropane was distilled off and the reaction content was extracted with 300 ml of ether, washed with water and dried. Thereafter, the solvent was distilled off thereby obtaining 17g of the end product as a pale yellow crystal (yield:56 percent). Upon recrystallizing from isopropanol, the melting point was 95°–96°C.

EXAMPLE 27

0-ethyl 0-n-butyl-1,3-dithian-2-ylidene malonate (compound No. 34)

An aqueous solution of the medium, disodium salt, was prepared from 18.8g(0.1 mol) of ethyl, n-butyl malonate, 7.6g(0.1 mol) of $CS_2$ and 26.7g(0.2 mol) of a 30 percent NaOH aqueous solution in accordance with the same operations employed in Example 19. 50 ml of water was added to said solution without isolating this disodium salt and lastly, 20g(0.1 mol) of 1,3-dibromopropane was gradually added dropwise thereto. The resultant solution was allowed to react by stirring for 2 hours at 60°–70°C. After reaction completion, the reaction product was extracted with 300 ml of chloroform and washed with water. The solvent was distilled off under reduced pressure to obtain 22.5g of the end product us a pale yellow crystal (yield:75 percent). Upon recrystallizing from n-hexane-benzene, the melting point was 68°–71°C.

EXAMPLE 28

Dimethyl 1,3-dithian-2-ylidene malonate (compound 27)

300 ml of acetone was poured into an aqueous solution of disodium salt of dimetoxy carbonyl ketene mercaptide obtained according to the operations employed in Example 13 and the resultant solution left standing for 2 hours at −5°C and as a result, crystal of disodium salt precipitated. This crystal was quickly collected by filtering and washed with a small quantity of acetone. Thereafter, said crystal was charged in 100 ml of water and 20g(0.1 mol) of 1,3-dibromopropane was slowly added dropwise thereto. The thus obtained solution was subjected to reaction by heating for 2 hours at 80°–90°C. After reaction completion, the reaction product was extracted with 300 ml of ether, washed with water and dried. Thereafter, the solvent was distilled off under reduced pressure, thereby 18g of a yellow solid with 39°–40°C of a melting point was obtained (yield: 72 percent).

EXAMPLE 29

Di-t-butyl-1,3-dithiethan-2-ylidene malonate
(compound No. 6)

300 ml of acetone was poured into an aqueous solution of dipotassium salt of di-t-butoxy carbonyl ketene mercaptide obtained according to the operations employed in Example 16 and the resultant solution left standing over night and as a result, a crystal of dipotassium salt precipitated. Said crystal was charged into 80 ml of water and 34.5g(0.2 mol) of 1,1-dibromoethane was slowly added thereto at 50°–60°C. The solution was allowed to react by stirring for 2 hours at the same temperature. Then, the reaction content was extracted with 300 ml of benzene, washed with water and dried. Thereafter, the solvent was distilled off thereby to obtain 22.5g of the end product as a yellow-white solid (yield:68 percent). Upon recrystallizing from n-hexane-benzene the melting point was 127°–129°C.

EXAMPLE 30

1,3-diisobutyl 1,3-dithiethan-2-ylidene malonate
(compound No. 4)

26.7g(0.2 mol) of a 30 percent NaOH aqueous solution was gradually added dropwise to a mixture of 21.2g(0.1 mol) of diisobutyl malonate and 7.6g(0.1 mol) of $CS_2$ at less than 20°C and further, stirring was continued for 30 minutes at the same temperature. To the resultant aqueous solution of diisobutoxy ketene disodium mercaptide, 50 ml of water was added.

Apart from the above operations, 26.8g(0.1 mol) of methylene diiodide was suspended in 20 ml of water. Then, said solution of the disodium salt was added to the above obtained suspension and subjected to reaction by stirring for 2 hours at 50°–80°C. After reaction completion, the reaction product was extracted with 250 ml of ether, washed with water and dried. Thereafter, the solvent was distilled off to obtain 25g of a yellow crystal with 45°–46°C as the melting point (yield:84 percent).

EXAMPLE 31

0-ethyl-0-isopropyl 1,3-dithian-2-ylidene malonate
(compound No. 33)

50 ml of water was added to an aqueous solution of the medium, disodium salt, according to the operations employed in Example 18 and then, 29.6g(0.1 mol) of 1,3-diiodo propane was added thereto and was subjected to reaction by heating for 2 hours at 50°–90°C. After reaction completion, the reaction product was poured into a large quantity of water. The formed oily product was extracted with 300 ml of benzene washed with water and dried. Thereafter, the solvent was distilled off under reduced pressure to obtain 25.5g of the end product as a pale yellow crystal (yield: 88 percent). Upon recrystallizing from n-hexane, the melting point was 57°–59°C.

In the following Examples, the term "part" denotes part by weight.

EXAMPLE 32

An emulsifiable concentrate was prepared by uniformly mixing and dissolving the following substances:
20 parts of diisopropyl 1,3-dithiolan-2-ylidene malonate
20 parts of tetrahydrofuran
45 parts of xylene
15 parts of a mixture of polyoxyethylene nonyl phenyl ether and alkyl benzene sulfonate

EXAMPLE 33

A wettable powder was prepared by intimately mixing and grinding the following substances:
50 parts of diisopropyl 1,3-dithiolan-2-ylidene malonate
45 parts of a mixture of diatomaceous earth and clay
5 parts of polyoxyethylene nonyl phenyl ether

EXAMPLE 34

Granules were prepared by intimately mixing and grinding the following substances:
4 parts of diisopropyl 1,3-dithiolan-2-ylidene malonate
95 parts of a mixture of diatomaceous earth and clay
1 part calcium stearate

EXAMPLE 35

Granules were prepared by intimately mixing and kneading, with addition of an optimum quantity of water, the following substances:
10 parts of diisopropyl 1,3-dithiolan-2-ylidene malonate
80 parts of a mixture of diatomaceous and bentonite
10 parts of lignin sulfonate

What is claimed is:

1. A process for the manufacture of the compound represented by formula I $$(CH_2)n \begin{array}{c} S \\ \diagup \\ \diagdown \\ S \end{array} C=C \begin{array}{c} COOR \\ \diagdown \\ COOR' \end{array} \quad I$$

wherein R is a $C_1$–$C_4$ lower alkyl group or allyl group; R' is a $C_1$–$C_4$ lower alkyl group of allyl group; and n is an integral number 1, 2 or 3, which comprises reacting carbon disulfide with malonic acid diester represented by the formula $$CH_2 \begin{array}{c} COOR \\ \diagdown \\ COOR' \end{array}$$

wherein R and R' are defined above, in an alkaline aqueous solution and then reacting the product with the compound represented by the formula $$\begin{array}{c} hal \\ \diagdown \\ (CH_2)n \\ \diagup \\ hal \end{array}$$

wherein $n$ is an integral number 1, 2 or 3 and hal is a halogen atom.

2. The process of claim 1, wherein malonic acid diester is malonic acid di-$C_1$–$C_4$ lower alkyl ester.

3. The process of claim 2, wherein malonic acid diester is malonic acid diethyl ester.

4. The process of claim 2, wherein malonic acid diester is malonic acid diisopropyl ester.

5. The process of claim 1, wherein dihalogenoalkane is dihalogenomethane.

6. The process of claim 1, wherein dihalogenoalkane is 1,2-dihalogenoethane.

7. The process of claim 6, wherein 1,2-dihalogenoethane is 1,2-dichloroethane or 1,2-dibromoethane.

8. The process of claim 1, wherein dihalogenoalkane is 1,3-dihalogenopropane.

9. The process of claim 1, which comprises adding carbon disulfide to malonic acid diester and reacting the resultant adduct, dialkali salt, with dihalogenoalkane without isolating said salt.

10. The process of claim 1, which comprises adding carbon disulfide to malonic acid diester and thereafter, reacting the resultant adduct, dialkali salt isolated with dihalogenoalkane.

11. The process of claim 1, wherein an alkali is NaOH or KOH.

12. The process of claim 11, wherein the concentration of NaOH is 20-40 percent by weight.

13. The process of claim 11, wherein the concentration of KOH is 30-60 percent by weight.

14. The process of claim 1, wherein 2 to 4 mol of alkali, 1 to 1.5 mol of $CS_2$ and 1 to 8 mol of dihalogenoalkane are used per 1 mol of malonic acid diester.

15. The process of claim 14, wherein the mole ratio of alkali is from 3 to 4 mol.

16. The process of claim 14, wherein the mole ratio of dihalogenoalkane is from 3 to 5 mol.

17. The process of claim 1, wherein the 1st process is effected at low temperature ranges and the 2nd process is effected at 50° to 90°C.

18. The process of claim 1, in which diisopropyl, 1,3-dithiolan-2-ylidene malonate is manufactured.

19. The process of claim 1, in which diethyl, 1,3-dithiolan-2-ylidene malonate is manufactured.

20. The process of claim 1, in which diisopropyl, 1,3-dithian-2-ylidene is manufactured.

21. The process of claim 1, in which diethyl 1,3-dithian-2-ylidene is manufactured.

22. The process of claim 2, wherein the reaction is carried out in an aqueous solution containing said alkali in a molar excess of the stoichiometric amount needed to complete the reaction.

23. The process of claim 10, wherein the reactions are carried out in an aqueous solution containing said alkali in a molar excess of the stoichiometric amount needed to complete the reaction.

* * * * *